United States Patent
Stark

(10) Patent No.: US 7,776,962 B2
(45) Date of Patent: Aug. 17, 2010

(54) LESS SHEAR-THINNING POLYVINYL ACETALS

(75) Inventor: Kurt Stark, Neuhaus (DE)

(73) Assignee: Kuraray Europe GmbH, Frankfurt am Main (DE)

(*) Notice: Subject to any disclaimer, the term of this patent is extended or adjusted under 35 U.S.C. 154(b) by 307 days.

(21) Appl. No.: 11/719,040

(22) PCT Filed: Nov. 3, 2005

(86) PCT No.: PCT/EP2005/011771

§ 371 (c)(1),
(2), (4) Date: May 10, 2007

(87) PCT Pub. No.: WO2006/050853

PCT Pub. Date: May 18, 2006

(65) Prior Publication Data

US 2007/0293645 A1    Dec. 20, 2007

(30) Foreign Application Priority Data

Nov. 11, 2004    (DE) .................. 10 2004 054 569

(51) Int. Cl.
*C08F 8/00* (2006.01)
(52) U.S. Cl. .............. 525/61; 525/154; 525/328.8; 525/330.3; 525/330.6; 525/383
(58) Field of Classification Search ........... 525/61, 525/154, 155, 328.8, 330.3, 330.6, 383
See application file for complete search history.

(56) References Cited

U.S. PATENT DOCUMENTS

| | | | |
|---|---|---|---|
| 3,926,918 A | 12/1975 | Sekisui | |
| 5,367,015 A | 11/1994 | Gutweiler et al. | |
| 5,559,175 A | 9/1996 | Kroggel et al. | |
| 5,594,069 A * | 1/1997 | David et al. ............... | 525/61 |
| 6,870,009 B2 * | 3/2005 | Stark et al. ............... | 525/162 |
| 2005/0159545 A1 | 7/2005 | Mashiko et al. | |

FOREIGN PATENT DOCUMENTS

| | | |
|---|---|---|
| DE | 2365005 A | 7/1974 |
| EP | 0535643 A1 | 4/1993 |
| EP | 0594026 A2 | 4/1994 |
| JP | 10-158328 A | 6/1998 |
| JP | 2000-159831 A | 6/2000 |
| JP | 2001-288215 A | 10/2001 |
| WO | WO 03066690 A1 | 8/2003 |
| WO | WO 2006002832 A1 | 1/2006 |

OTHER PUBLICATIONS

Machine translation of EP 0594026 A2, translated on Mar. 23, 2009.*
Patent Abstract of PCT corresponding to WO 2006002832 A1, Retrieved May 16, 2007.
Patent Abstract of Japan corresponding to JP 2001-288215 A, 2001.
Patent Abstract of Japan corresponding to JP 2000-159831 A, 2000.
Patent Abstract of Japan corresponding to JP 10-158328 A, 1988.
Ruttens Frank, "Polyvinylbutyral, more than just a binder", Journal of Imaging Science and Technology, 43 ( 6 ), 19999, p. 535-539.

* cited by examiner

*Primary Examiner*—Marc S Zimmer
*Assistant Examiner*—Nicole M Buie-Hatcher
(74) *Attorney, Agent, or Firm*—Brooks Kushman P.C.

(57) ABSTRACT

Low shear-thinning polyvinyl acetals having a solution viscosity in 30% strength by weight solution in methyl ethyl ketone which changes by not more than 10% in a shear rate range from 1 to 100 $s^{-1}$. The preparation of the low shear-thinning polyvinyl acetals involves acetalation of partly hydrolyzed or completely hydrolyzed vinyl ester polymers comprising ≧50 mol % of vinyl alcohol units with one or more aldehydes, optionally in the form of the hydrates, hemiacetals or full acetals, wherein from 0 to 60% by weight of the aldehyde, based on the total amount of the aldehyde, is initially introduced over the course of the first one to ten minutes of the acetalation and is prereacted over the course of from 1 to 30 minutes, and the remaining proportion is then metered in continuously over the course of at least 20 minutes.

14 Claims, No Drawings

LESS SHEAR-THINNING POLYVINYL ACETALS

CROSS-REFERENCE TO RELATED APPLICATION

This application is the U.S. national phase of PCT Appln. No. PCT/EP2005/011771 filed Nov. 3, 2005 which claims priority to German application 10 2004 054 569.3 filed Nov. 11, 2004.

BACKGROUND OF THE INVENTION

1. Field of the Invention

The invention relates to low shear-thinning polyvinyl acetals, processes for the preparation of low shear-thinning polyvinyl acetals, and the use thereof.

2. Description of the Related Art

The preparation of polyvinyl acetals which are obtained from the corresponding polyvinyl alcohols by polymer-analogous reaction with the corresponding aldehydes has been known since 1924, and a multiplicity of aldehydes have subsequently been used for the preparation of the corresponding polyvinyl acetals. Polyvinyl acetals are prepared in a 3-stage process (polyvinyl acetate→polyvinyl alcohol→polyvinyl acetal), products which also contain vinyl alcohol and vinyl acetate units in addition to vinyl acetal groups resulting. Polyvinyl formal, polyvinyl acetacetal and polyvinyl butyral (PVB) are of particular commercial importance.

Inter alia because of their good pigment binding power, polyvinyl butyrals are also used as binders in coatings and especially in printing inks. In this Application, there is the requirement that the organic solutions of the polyvinyl acetals have as constant a solution viscosity as possible even at high shear load, i.e. also in high-speed printing presses. Newtonian behaviour is required, regardless of the applied shear rate.

EP 535643 A1 relates to a process for the preparation of polyvinyl acetals having improved melt viscosity by means of acetalation of vinyl alcohol, copolymers with a proportion of polyethylenically unsaturated comonomers. For the acetalation, polyvinyl alcohol and aldehyde are initially introduced and the acid is metered in continuously. JP-A 2001-288215 discloses a process for the preparation of polyvinyl acetals resins, in which polyvinyl alcohol and aldehyde are each partly initially introduced, and the remaining proportions are each metered in portions after cooling of the reaction mixture. In JP-A 2000-159831, for the preparation of polyvinyl acetal, the main proportion of the polyvinyl alcohol is initially introduced, acid catalyst and aldehyde are added and the remainder of polyvinyl alcohol is metered in. In the process of JP-A 10-158328, the acetalation is optimized by means of addition of already acetalated polyvinyl alcohol. WO 03/066690 relates to a process for the preparation of polyvinyl acetals having low metal contents, the acetalation of polyvinyl alcohol being effected in two reactors connected in series.

J. IMAG. SCI. TECHNOL. 43, 535 (1999) investigates polyvinyl acetal solutions in methyl ethyl ketone whose solution viscosity changes drastically in a shear rate range from 1 to 100 $s^{-1}$. DE-A 2365005 describes a process for the preparation of polyvinyl acetals wherein the acetalation is carried out in two temperature ranges and the proportion of aldehyde is in each case not metered in continuously but is added intermittently. EP 594026 A2 describes a process for the preparation of polyvinyl acetal dispersions wherein the aldehyde portion is metered in continuously over several hours.

SUMMARY OF THE INVENTION

It was an object of the invention to provide polyvinyl acetals which exhibit low shear thinning, in particular in organic solvents, independently of the polymer composition and concentration, at high shear load, i.e. virtually constant solution viscosity or Newtonian rheological behaviour in organic solvents independently of the shear rate. The invention thus relates to low shear-thinning polyvinyl acetals, characterized in that the solution viscosity thereof measured in 30% by weight solution in methyl ethyl ketone changes by not more than 10% in a shear rate range from 1 to 100 s-1.

The invention furthermore relates to a process for the preparation of low shear-thinning polyvinyl acetals by acetalation of partly hydrolyzed or completely hydrolyzed vinyl ester polymers comprising >50 mol % of vinyl alcohol units with one or more aldehydes, optionally in the form of the hydrates, hemiacetals or full acetals thereof, wherein from 0 to 60% by weight, based on the total amount of aldehyde, is initially introduced over the course of the first one to ten minutes of the acetalation and is subjected to a preliminary reaction over the course of from 1 to 30 minutes, and the remaining proportion is then metered in continuously over the course of at least 20 minutes.

DETAILED DESCRIPTION OF THE PREFERRED EMBODIMENT

Suitable partly hydrolyzed or completely hydrolyzed vinyl ester polymers are derived from polymers which contain from 50 to 100 mol % of vinyl ester units. Suitable vinyl esters are vinyl esters of straight-chain or branched carboxylic acids having 1 to 15 carbon atoms. Preferred vinyl esters are vinyl acetate, vinyl propionate, vinyl butyrate, vinyl 2-ethylhexanoate, vinyl laurate, 1-methylvinyl acetate (isopropenyl acetate), vinyl pivalate and vinyl esters of α-branched monocarboxylic acids having 5 to 11 carbon atoms, for example VeoVa9R or VeoVa10R (trade names of Shell). Vinyl acetate is particularly preferred.

In addition to the vinyl ester units, one or more monomers from among methacrylates and acrylates of alcohols having 1 to 15 carbon atoms, olefins, dienes, vinylaromatics and vinyl halides may optionally also be copolymerized. Suitable monomers from the group of the esters of acrylic acid or methacrylic acid are esters of straight-chain or branched alcohols having 1 to 15 carbon atoms. Preferred methacrylates or acrylates are methyl acrylate, methyl methacrylate, ethyl acrylate, ethyl methacrylate, propyl acrylate, propyl methacrylate, n-butyl, isobutyl and tert-butyl acrylate, n-butyl, isobutyl and tert-butyl methacrylate, 2-ethylhexyl acrylate and norbornyl acrylate. Methyl acrylate, methyl methacrylate, n-butyl, isobutyl and tert-butyl acrylate, 2-ethylhexyl acrylate and norbornyl acrylate are particularly preferred. Suitable dienes are 1,3-butadiene and isoprene. Examples of polymerizable olefins are ethene and propene. Vinylaromatics which may be incorporated in the form of polymerized units are styrene and vinyltoluene. From the group of the vinyl halides, vinyl chloride, vinylidene chloride and vinyl fluoride are usually used, preferably vinyl chloride. The proportion of these comonomers is such that the proportion of vinyl ester monomer is ≧50 mol % in the vinyl ester polymer.

Further comonomers may optionally also be contained, preferably in a proportion of from 0.02 to 20% by weight, based on the total weight of the vinyl ester polymer. Examples of such comonomers are ethylenically unsaturated mono- or dicarboxylic acids, preferably crotonic acid, itaconic acid, fumaric acid and maleic acid; ethylenically unsaturated carboxamides and carbonitriles, preferably N-vinylformamide; cyclic amides which carry an unsaturated group on the nitrogen such as N-vinylpyrrolidone; mono- and diesters of fumaric acid and maleic acid, such as the diethyl and diisopropyl and esters; maleic anhydride and ethylenically unsaturated sulfonic acids or salts thereof, preferably vinylsulfonic acid. Other suitable comonomers are cationic monomers, such as diallyldimethylammonium chloride (DADMAC), 3-trimethyl-ammoniumpropyl(meth)acrylamide chloride (MAPTAC), and 2-trimethylammoniummethyl(meth)acrylate chloride. Vinyl ethers and vinyl ketones are furthermore suitable as auxiliary monomers.

Other suitable comonomers are polymerizable silanes or mercaptosilanes. γ-Acryloyl- or γ-methacryloyloxypropyltri(alkoxy)silanes, α-methacryloyloxymethyltri(alkoxy)silanes, γ-methacryloyloxypropylmethyldi(alkoxy)silanes, vinylalkyldi(alkoxy)silanes and vinyltri(alkoxy)silanes are preferred, it being possible, for example, for methoxy, ethoxy, methoxyethylene, ethoxyethylene, methoxypropylene glycol ether or ethoxypropylene glycol ether radicals to be used as alkoxy groups. Examples of these are vinyltrimethoxysilane, vinyltriethoxysilane, vinyltripropoxysilane, vinyltriisopropoxysilane, vinyltris(1-methoxy)isopropoxysilane, vinyltributoxysilane, vinyltriacetoxysilane, 3-methacryloyloxypropyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, 3-(triethoxysilyl)propylsuccinic anhydride silane. 3-Mercaptopropyltriethoxysilane, 3-mercaptopropyltrimethoxysilane and 3-mercaptopropylmethyldimethoxysilane are also preferred.

Further examples are precrosslinking comonomers such as polyethylenically unsaturated comonomers, for example divinyl adipate, diallyl maleate, allyl methacrylate, butanediol diacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide, N-methylolallylcarbamate, alkyl ethers, such as isobutoxy ether or esters of N-methylolacrylamide, of N-methylolmethacrylamide and of N-methylolallylcarbamate.

These vinyl ester polymers are commercially available or can be prepared in a known manner by means of polymerization; preferably by mass polymerization, suspension polymerization or polymerization in organic solvents, most preferably in alcoholic solution. Suitable solvents and regulators are, for example, methanol, ethanol, propanol and isopropanol. The polymerization is carried out under reflux at a temperature of from 40° C. to 100° C. and is initiated by free radicals by adding customary initiators. Examples of customary initiators are percarbonates, such as cyclohexyl peroxydicarbonate, azo initiators or peresters, such as tert-butyl perneodecanoate or tert-butyl perpivalate. The molecular weight can be established in a known manner by addition of regulators, by means of the solvent content, by variation of the initiator concentration and by variation of the temperature. After the polymerization is complete, the solvent and any excess monomer and regulator are distilled off.

The hydrolysis of the vinyl ester polymers is effected in a manner known per se, for example by the belt or kneader method in an alkaline or acidic medium with addition of acid or base. Preferably, the vinyl ester solid resin is taken up in alcohol, for example methanol, a solids content of from 15 to 70% by weight being established. The hydrolysis is preferably carried out in a basic medium, for example by addition of NaOH, KOH or NaOCH$_3$. The base is generally used in an amount of from 1 to 5 mol % per mole of ester units. The hydrolysis is carried out at temperatures of from 20° C. to 70° C. After the hydrolysis is complete, the solvent is distilled off and the polyvinyl alcohol is obtained as a powder. The polyvinyl alcohol can, however, also be obtained as an aqueous solution by successive addition of water while the solvent is being distilled off.

Completely hydrolyzed vinyl ester polymers are defined as those polymers which have a degree of hydrolysis of >96 mol %. Partly hydrolyzed polyvinyl esters are to be understood as meaning those having a degree of hydrolysis of ≧50 mol % and ≦96 mol %. The partly or completely hydrolyzed vinyl ester polymers preferably have a degree of hydrolysis of from 50 mol % to 99.9 mol %, more preferably from 70 mol % to 99.9 mol %, and most preferably from 90 mol % to 99.9 mol %. The viscosity of the polyvinyl alcohol (DIN 53015, Höppler method; 4% strength solution in water) is from 1 to 30 mPa·s, preferably from 1 to 10 mPa·s, and serves as a measure of the molecular weight and of the degree of polymerization of the partly or completely hydrolyzed vinyl ester polymers. The degree of polymerization of the polyvinyl alcohol used is at least 130.

Preferred aldehydes are aliphatic and aromatic aldehydes having 1 to 15 carbon atoms and mixtures thereof. Particularly preferred aldehydes from the group consisting of the aliphatic aldehydes having 1 to 15 carbon atoms are formaldehyde, acetaldehyde, propionaldehyde and most preferably butyraldehyde, or a mixture of butyraldehyde and acetalaldehyde. Aromatic aldehydes used may be, for example, benzaldehyde or derivatives thereof. The aldehyde can also be used in the form of the hemiacetals, full acetals, or aldehyde hydrates thereof. The amount of aldehyde added depends on the desired degree of acetalation. Since the acetalation takes place with virtually complete conversion, the amount added can be determined by simple stoichiometric calculation.

For the acetalation, the partly or completely hydrolyzed polyvinyl esters are preferably taken up in an aqueous medium. Usually, a solids content of the aqueous solution of from 5 to 30% by weight is established. The acetalation is effected in the presence of acidic catalysts, such as hydrochloric acid, sulphuric acid, nitric acid or phosphoric acid. In a preferred embodiment, the pH of the solution is initially adjusted to values of ≦5, then to values of ≦1, by adding 20% strength hydrochloric acid or 35% strength nitric acid.

After addition of the catalysts, the solution is cooled, preferably to 10° C. to +30° C. In this case, the following is applicable: the lower the molecular weight of the modified polyvinyl alcohol used, the lower the precipitation temperature chosen. The acetalation reaction is initiated by adding the aldehyde, hemiacetal, or full acetal thereof.

From 0.1 to 60% by weight, preferably from 1 to 50% by weight, and more preferably from 3 to 30% by weight, based in each case on the total amount of aldehyde, hydrate, hemiacetal, or full acetal, of the aldehyde or hemiacetal or full acetal component is initially introduced in the course of the first one to ten minutes of the acetalation and subjected to a preliminary reaction over the course of from 1 to 30 minutes, a pH of from 0 to 5 being established. The time window for the addition of the initially introduced aldehyde is preferably from one to 5 minutes. The remaining proportion is then metered in continuously over the course of at least 20 minutes, a pH of <1 being advisable. This is preferably effected over a period of from 20 to 120 minutes.

After the addition of the aldehyde is complete, the acetalation is completed by heating the batch to 20° C. to 60° C. and stirring for several hours, preferably from 1 to 6 hours, and the pulverulent reaction product is isolated by filtration and a downstream washing step. For stabilization, alkalis may furthermore be added. During the precipitation and the aftertreatment, emulsifiers can be employed in order to stabilize the aqueous suspension of the polyvinyl acetal.

In a particularly preferred process, one or more aldehydes or hydrates or hemiacetals or full acetals thereof are first added to the aqueous solution of the polyvinyl alcohol, preferably above the precipitation temperature. The amount of aldehyde is from 0.1 to 60% by weight, preferably from 1 to 50% by weight, more preferably from 3 to 30% by weight, based in each case on the total amount of aldehyde or hydrate or hemiacetal or full acetal thereof. Using a catalyst, for example hydrochloric acid or nitric acid, a pH of from 0 to 5 is established, so that the aldehyde can undergo preliminary reaction for a relatively long time (up to 30 minutes) with the polyvinyl alcohol. The precipitation of the polyvinyl acetal is then carried out at the precipitation temperature by adding the remaining amount of aldehyde, which is metered in over the course of at least 20 minutes. For the precipitation, further catalyst can optionally be added, so that the pH is preferably $\leq 1$. The workup process described above then follows.

By means of this procedure, low shear-thinning polyvinyl acetals are obtainable. Low shear-thinning is to be understood as meaning that the solution viscosity of a 30% strength solution of the respective polyvinyl acetal in methyl ethyl ketone changes in a shear rate range from 1 to 100 s-1 only by not more than 10%, and preferably generally decreases, i.e. structural viscosity or shear thinning. The solution viscosity is determined in a manner known to the person skilled in the art, using commercial rheometers, for example using a cone-and-plate measuring system. For example, the measuring method for viscosity measurement which is described in the examples can be used. In the inventive polyvinyl acetals the solution viscosity thereof, measured using a cone-and-plate measuring system, in 30% strength by weight solution in methyl ethyl ketone changes by not more than 10% in a shear rate range from 1 to 100 s$^{-1}$.

The low shear-thinning polyvinyl acetals are suitable in particular for use as binders in printing inks. Suitable printing ink formulations are known to the person skilled in the art and contain in general from 5 to 50% by weight of pigment, for example disazo or phthalocyanine pigments, from 4 to 25% by weight of polyvinyl acetal binder and solvent, for example alcohols such as ethanol, or esters such as ethyl acetate. Further additives, such as retardants, adhesion promoters, plasticizers and other additives, such as, for example, fillers or waxes, can optionally also be present.

The low shear-thinning polyvinyl acetals are also very suitable for laminated safety glass, glass laminates, high-performance safety glass or glazing films.

The low shear-thinning polyvinyl acetals can furthermore advantageously be used as binders in water-based coatings or coatings based on organic solvents, for example as binders for the internal coating of cans. Further fields of use of the low shear-thinning polyvinyl acetals are the use as binders in corrosion inhibitors. Furthermore, the low shear-thinning polyvinyl acetals are also suitable as binders in the ceramics industry, especially as binders for ceramic green compacts. The use as binders for ceramic powders and metal powders in powder injection moulding may also be mentioned.

The low shear-thinning polyvinyl acetals can furthermore be used as binders for photographic films. They can profitably be used in particular as binders for photothermographic materials.

The following examples serve for further explaining the invention without limiting it in any way:

Example 1

1200 ml of distilled water and 2400 ml of a 10.0% strength aqueous solution of a mixture of two completely hydrolyzed, commercially available polyvinyl alcohols (mixture of Clariant Mowiol 4-98 (20%) and Clariant Mowiol 6-98 (80%), viscosity 5.4 mPa·s (DIN 53015; Höppler method; 4% strength aqueous solution) were initially introduced into a 6 liter glass reactor. The measured pH of this initially introduced mixture was 5.4. A pH of 4.2 was established by adding a little 35% strength nitric acid. Cooling to 10° C. was then effected with stirring, and 21.7 g of butyraldehyde were added over the course of 5 min at this temperature. The butyraldehyde was subjected to preliminary reaction with the polyvinyl alcohol mixture for 10 min at 10° C., with the result that effective linkage took place. Thereafter, cooling to 2.7° C. was effected, and 500 ml of 35% strength nitric acid were added. The internal temperature increased to 7° C. After further cooling to 1° C. (precipitation temperature), 194.8 g of butyraldehyde were then metered in within a period of 40 minutes. During this procedure, the polyvinyl alcohol was precipitated. After a reaction time of a further 40 minutes at 1° C., the temperature was increased to 26° C. over a period of 3.5 hours, and this temperature was maintained for a further 2.5 hours. Thereafter, the product was filtered off and was washed with distilled water until the filtrate was neutral. Drying was then effected to a solids content of at least 98%, initially at 22° C. and then at 35° C. in vacuo.

A white, pulverulent polyvinyl butyral comprising 11.8% by weight of vinyl alcohol units was obtained. The vinyl acetate content was below 2.0% by weight.

Example 2

The procedure was analogous to example 1. However, a mixture of the commercially available polyvinyl alcohols Clariant Mowiol 4-98 (10%) and Clariant Mowiol 6-98 (90%), viscosity 5.6 mPa·s (DIN 53015; Höppler method; 4% strength aqueous solution) was used.

A white, pulverulent polyvinyl butyral comprising 12.2% by weight of vinyl alcohol units was obtained. The vinyl acetate content was below 2.0% by weight.

Example 3

1200 ml of distilled water and 2400 ml of a 10.0% strength aqueous solution of a mixture of two completely hydrolyzed, commercially available polyvinyl alcohols (mixture of Clariant Mowiol 4-98 (30%) and Clariant Mowiol 6-98 (70%)), viscosity 5.2 mPa·s (DIN 53015; Höppler method; 4% strength aqueous solution) were initially introduced into a 6 liter glass reactor. The measured pH of this initially introduced mixture was 5.6. A pH of 3.5 was established by adding a little 35% strength nitric acid. Cooling to 10° C. was then effected with stirring, and 36.9 g of butyraldehyde were added over the course of 5 min at this temperature. The butyraldehyde was subjected to preliminary reaction with the polyvinyl alcohol mixture for 10 min at 10° C., with the result that effective linkage took place. Thereafter, cooling to 2.7° C. was effected, and 500 ml of 35% strength nitric acid were added. The internal temperature increased to 7° C. After further cooling to 1° C. (precipitation temperature), 147.6 g of butyraldehyde were then metered in within a period of 50 minutes. During this procedure, the polyvinyl butyral was precipitated. After a reaction time of a further 40 minutes at 1° C., the temperature was increased to 26° C. over a period of 3.5 hours, and this temperature was maintained for a further 2.5 hours. Thereafter, the product was filtered off and was washed with distilled water until the filtrate was neutral. Drying was then effected to a solids content of at least 98%, initially at 22° C. and then at 35° C. in vacuo.

A white, pulverulent polyvinyl butyral comprising 14.3% by weight of vinyl alcohol units was obtained. The vinyl acetate content was below 2.0% by weight.

Example 4

2715 ml of distilled water and 1172 ml of a 20.0% strength aqueous solution of a mixture of a completely hydrolyzed polyvinyl alcohol of the type 03/20, viscosity 3.4 mPa·s (DIN 53015; Höppler method; 4% strength aqueous solution) were initially introduced into a 6 liter glass reactor. The measured pH of this initially introduced mixture was 5.5. By adding a little 35% strength hydrochloric acid, a pH of 3.5 was established. Cooling to 10° C. was then effected with stirring, and 30.1 g of butyraldehyde were added at this temperature over the course of 5 min. The butyraldehyde was subjected to preliminary reaction with the polyvinyl alcohol mixture for 20 min at 10° C., with the result that effective linkage took place. Thereafter, cooling to 2.7° C. was effected, and 500 ml of 35% strength nitric acid were added. During this procedure, the internal temperature increased to 7° C. After further cooling to 2° C. (precipitation temperature), 170.4 g of butyraldehyde were then metered in within a period of 35 minutes. During this procedure, the polyvinyl butyral was precipitated. After a reaction time of a further 40 minutes at 2° C., the temperature was increased to 26° C. over a period of 3.5 hours and this temperature was maintained for a further 2.5 hours. Thereafter, the product was filtered off and was washed with distilled water until the filtrate was neutral. Drying was then effected to a solids content of at least 98%, initially at 22° C. and then at 35° C. in vacuo.

A white, pulverulent polyvinyl butyral comprising 13.2% by weight of vinyl alcohol units was obtained. The vinyl acetate content was below 2.0% by weight. The viscosity (10% in EtOH) was 24.1 mPa·s.

Example 5

The initially introduced mixture was as in example 4, except that a pH of 0 was established with 520 ml of 35% strength nitric acid. 200.5 g of butyraldehyde were added continuously to the initially introduced mixture at a precipitation temperature of −2° C. in a time of 25 min. During this procedure, the polyvinyl butyral was precipitated. The further working-up was effected as in example 4.

A white, pulverulent polyvinyl butyral comprising 14.0% by weight of vinyl alcohol units was obtained. The vinyl acetate content was below 2.0% by weight. The viscosity (10% in EtOH) was 24.6 mPa·s.

Comparative Example C6

A commercial polyvinyl butyral having an analogous molecular weight and comparable OH number (% by weight of vinyl alcohol units) as in the case of the polyvinyl butyral from example 1.

Methods of Determination:

1. Determination of the dynamic viscosity of a solution of polyvinyl acetals:

90.00+0.01 g of ethanol and 10.00+0.01 g of polyvinyl acetal were weighed into a 250 ml conical flask with a ground glass stopper and completely dissolved at 50° C. in a mechanical shaker. Thereafter, cooling to 20° C. was effected and the dynamic viscosity (DIN 53 015; Höppler method) was determined at 20° C. using a suitable ball, e.g. ball 2 or 3.

2. Determination of the Vinyl Alcohol Content:

The content of vinyl alcohol groups in the polyvinyl acetal was determined by acetylation of the hydroxyl groups with acetic anhydride in the presence of pyridine and 4-dimethylaminopyridine.

For this purpose, 1 g±0.001 g of polyvinyl acetal was dissolved in 24 ml of pyridine and 0.04 g of 4-dimethylaminopyridine at 50° C. in the course of 2 hours. The solution cooled to 25° C. was mixed with 10 ml of a mixture of pyridine and acetic anhydride (87/13 parts by volume) and thoroughly mixed for 1 hour. Thereafter, 30 ml of a pyridine/water mixture (5/1 parts by volume) were added and shaking was effected for a further hour. Titration to pH 7 was then effected with methanolic 0.5 N KOH.

3. Determination of the Viscosity of Polyvinyl Alcohol Solutions:

The viscosity of the partly or completely hydrolyzed solid resins used as starting materials was determined analogously to the determination of the dynamic viscosity of the polyvinyl acetals, except that 4% strength aqueous solutions were used.

Testing of Performance Characteristics:

a) Preparation of Organic Solutions Comprising Polyvinyl Acetal (30% Strength Solution in Methyl Ethyl Ketone):

75 g of polyvinyl acetal were dissolved in 175 g of methyl ethyl ketone (MEK) in a closable glass vessel having a volume of 500 ml at 23° C. and stirred in thoroughly with the aid of a dissolver (mechanical stirrer at 3000 rpm) for at least 15 min. Thereafter, the vessel was closed and stirring was effected with a magnetic stirrer for a further 3 h 45 min. After these 4 h, the polyvinyl acetal had dissolved completely and homogeneously in MEK. The solution was then characterized rheologically (cf. b)).

b) Measurement of the Solution Viscosity:

The 30% strength solution of the polyvinyl acetal in MEK (prepared according to a) was measured using a Bohlin rheometer CVO 120 HR having a cone-and-plate measuring system (CP 4/40) at 20° C. In order to avoid evaporation, the measuring system was covered with a solvent trap. For the measurement, about 4 g of the solution were introduced into the measuring system in the course of 1.5 min. After these 1.5 min, the solution was presheared continuously for 90 s at a constant shear rate of 10 s$^{-1}$. A waiting time of 60 s was then allowed and a preset measuring programme which begins at a shear rate of 0.3 s$^{-1}$ and ends at 500 s$^{-1}$ and then returns to a shear rate of 0.3 s$^{-1}$ was then started. Within this shear rate range from 0.3 s$^{-1}$ to 500 s$^{-1}$, 40 measuring points were recorded for the viscosity, for which purpose the respective corresponding shear rate was kept constant for a short time (constant rate test). The viscosity at a shear rate of 1 s$^{-1}$ and 100 s$^{-1}$ was evaluated.

Table 1 shows the results of the rheological measurement according to b) on 30% strength solutions of polyvinyl acetal in MEK.

TABLE 1

| Example | $\eta_1$[mPas] at 1 s$^{-1}$ | $\eta_2$[mPas] at 100 s$^{-1}$ | $\eta_1/\eta_2$ | $[(\eta_2 - \eta_1)/\eta_1] \times 100$ [%] |
|---|---|---|---|---|
| 1 | 4500 | 4360 | 1.032 | −3.1 |
| 2 | 5000 | 4790 | 1.044 | −4.2 |
| 3 | 3430 | 3330 | 1.030 | −2.9 |
| 4 | 810 | 790 | 1.025 | −2.5 |
| 5 | 860 | 800 | 1.075 | −7.0 |
| C6 | 6200 | 4550 | 1.363 | −26.6 |

As is evident from the table, the preparation process according to the invention leads to polyvinyl acetals which exhibit Newtonian rheological behaviour in solution (in this case 30% strength in MEK), i.e. the viscosity of these solutions is virtually independent of the shear rate in the shear rate range from 1 to 100 s$^{-1}$. This is shown by examples 1 to 5, where the decrease in the viscosity at 100 s$^{-1}$, based on the value at 1 s$^{-1}$, is only at most 7.0%, i.e. is clearly in the range set.

Commercially available polyvinyl acetals do not exhibit this behaviour (V6). Here, the decrease in the viscosity at the shear rate 100 s$^{-1}$, based on the value at the shear rate 1 s$^{-1}$, is well above 20%, i.e. is clearly in the two-digit range.

A further advantage of the preparation process according to the invention is that polyvinyl acetals which always dissolve in organic solvents to give absolutely clear solutions are obtained. Conventional commercial products constantly show slight turbidity here.

The invention claimed is:

1. A process for the preparation of low shear-thinning polyvinyl acetals, the solution viscosity thereof, measured using a cone-and-plate measuring system in 30% strength by weight solution in methyl ethyl ketone, varying by not more than 10% in a shear rate range from 1 to 100 s$^{-1}$, comprising acetalizing partly hydrolyzed or completely hydrolyzed vinyl ester polymers comprising $\geq$50 mol % of vinyl alcohol units with one or more aldehydes, optionally in the form of their hydrates, hemiacetals or full acetals, wherein from 0.1 to 60% by weight of the aldehyde, based on the total amount of aldehyde, is initially introduced over the course of the first one to ten minutes of the acetalizing and is prereacted for from 1 to 30 minutes, and the remaining proportion is then metered in continuously over the course of at least 20 minutes, wherein acetalization takes place at a temperature of from −10° C. to 30° C.

2. The process of claim 1, wherein acetalizing is effected with one or more aldehydes selected from the group consisting of aliphatic and aromatic aldehydes having 1 to 15 carbon atoms.

3. The process of claim 1, wherein the proportion of aldehyde is initially introduced over the course of the first one to 5 minutes of the acetalizing.

4. The process of claim 1, wherein the aldehydes are selected from the group consisting of formaldehyde, acetaldehyde, propionaldehyde, butyraldehyde, and mixtures thereof.

5. The process of claim 1, wherein the aldehyde consists of butyraldehyde.

6. A process for the preparation of low shear-thinning polyvinyl acetals, the solution viscosity thereof, measured using a cone-and-plate measuring system in 30% strength by weight solution in methyl ethyl ketone, varying by not more than 10% in a shear rate range from 1 to 100 s$^{-1}$, comprising acetalizing partly hydrolyzed or completely hydrolyzed vinyl ester polymers comprising $\geq$50 mol % of vinyl alcohol units with one or more aldehydes, optionally in the form of their hydrates, hemiacetals or full acetals, wherein from 0.1 to 60% by weight of the aldehyde, based on the total amount of aldehyde, is initially introduced over the course of the first one to ten minutes of the acetalizing and is prereacted for from 1 to 30 minutes, and the remaining proportion is then metered in continuously over the course of at least 20 minutes, wherein the one or more aldehydes consists of acetaldehyde.

7. A process for the preparation of low shear-thinning polyvinyl acetals, the solution viscosity thereof, measured using a cone-and-plate measuring system in 30% strength by weight solution in methyl ethyl ketone, varying by not more than 10% in a shear rate range from 1 to 100 s$^{-1}$, comprising acetalizing partly hydrolyzed or completely hydrolyzed vinyl ester polymers comprising $\geq$50 mol % of vinyl alcohol units with one or more aldehydes, optionally in the form of their hydrates, hemiacetals or full acetals, wherein from 0.1 to 60% by weight of the aldehyde, based on the total amount of aldehyde, is initially introduced over the course of the first one to ten minutes of the acetalizing and is prereacted for from 1 to 30 minutes, and the remaining proportion is then metered in continuously over the course of at least 20 minutes, wherein the one or more aldehydes consists of a mixture of acetaldehyde and butyraldehyde.

8. The process of claim 1, wherein after prereacting, no precipitation of polyvinyl acetal occurs, and polyvinyl acetal is precipitated by adding the remaining proportion of aldehyde at a precipitation temperature of the polyvinyl acetal.

9. The process of claim 1, wherein from 3 to 30% by weight of aldehyde is initially introduced, and the remaining proportion of aldehyde is metered in over the course of at least 20 minutes.

10. The process of claim 1, wherein a mixture of aldehydes are used, the mixture containing at least one of formaldehyde, acetaldehyde, propionaldehyde, and butyraldehyde, from 0.1 to 60% of the mixture initially introduced, and after prereacting, the remaining proportion of the mixture is introduced over the course of at least 20 minutes.

11. The process of claim 1, wherein the one or more aldehydes is a mixture of aldehydes which includes at least one $C_{1-15}$ aldehyde other than formaldehyde, acetaldehyde, propionaldehyde, and butyraldehyde.

12. The process of claim 1, wherein at least one of formaldehyde, acetaldehyde, propionaldehyde and butyraldehyde are used as an aldehyde, and precipitation does not occur prior to adding the remaining portion of aldehyde at a precipitation temperature of the polyvinyl acetal.

13. The process of claim 1, wherein precipitation does not occur prior to adding the remaining portion of aldehyde at a precipitation temperature of the polyvinyl acetal.

14. The process of claim 1, wherein the aldehyde is selected from the group consisting of $C_{1-15}$ aliphatic aldehydes and mixtures thereof.

* * * * *